UNITED STATES PATENT OFFICE.

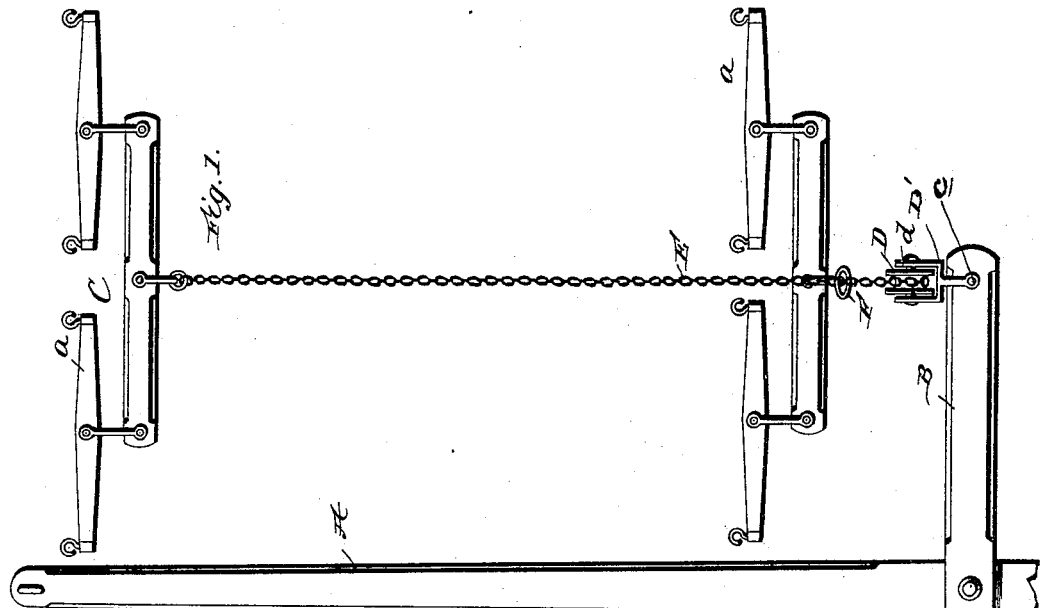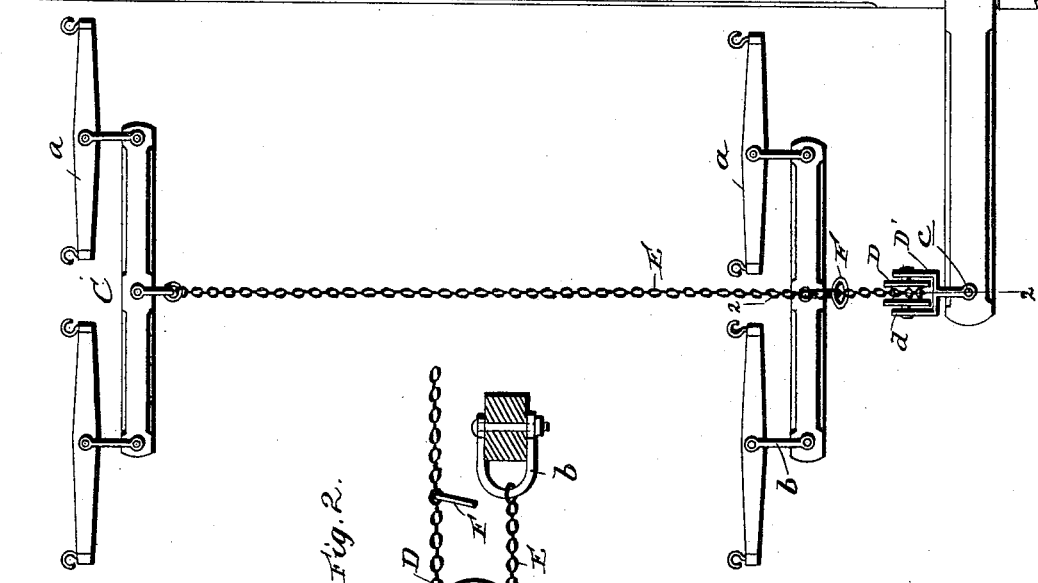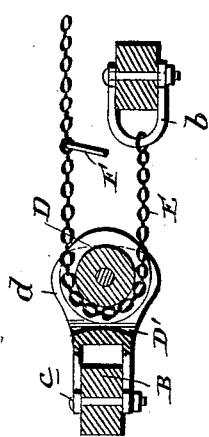

GEORGE W. RUSSELL, OF GREENE, IOWA.

DRAFT-EQUALIZER.

SPECIFICATION forming part of Letters Patent No. 618,736, dated January 31, 1899.

Application filed September 8, 1898. Serial No. 690,521. (No model.)

*To all whom it may concern:*

Be it known that I, GEORGE W. RUSSELL, a citizen of the United States, residing at Greene, in the county of Butler and State of Iowa, have invented new and useful Improvements in Draft-Equalizers, of which the following is a specification.

My invention relates to improvements in draft-equalizers, and contemplates the provision of an eight-horse draft-equalizer which while very simple is highly efficient in equally distributing the draft among the several draft-animals and is adapted to effectually prevent the rear animals from drawing the front animals backwardly from their proper working position.

With the foregoing in view the invention will be fully understood from the following description and claims when taken in conjunction with the annexed drawings, in which—

Figure 1 is a plan view of a draft-equalizer constructed in accordance with my invention. Fig. 2 is an enlarged detail section taken in the plane indicated by the line 2 2 of Fig. 1.

Referring by letter to said drawings, A designates a tongue or pole designed to be connected in the usual manner to a vehicle or other device to be drawn.

B designates a lever or evener-bar fulcrumed on or pivotally connected to the tongue or pole adjacent to the rear end thereof, and C designates four doubletrees, each of which is equipped with two singletrees and a clevis b, after the ordinary well-known manner. The doubletrees are disposed as shown in the drawings—that is to say, they are arranged in pairs and one in front of the other at opposite sides of the pole or tongue.

D designates pulleys, and D' designates clevises in which the pulleys are mounted and through the medium of which they are connected to the lever or evener-bar B. The clevises are pivotally connected to the lever or evener-bar B by bolts c and are of a peculiar construction in that they have cheek-pieces d, between which the pulleys are arranged, the said cheek-pieces resting quite close to the sides of the pulleys and extending above and below the peripheries of the same, as best shown in Fig. 2, so as to effectually prevent the chains presently described from moving laterally off the pulleys when the team makes a turn.

E are the chains, which have for their purpose to connect the front and rear doubletrees. These chains are connected to the clevises of the doubletrees and take around the pulleys D, as shown, and in consequence they are adapted, when the equalizer is in use, to distribute the draft between the front and rear draft-animals.

For the purpose of preventing the rear animals from drawing the front animals back of their proper working position, which would result in crowding and render the team difficult to handle I provide the chains E at about the points shown with stops F. These stops F are preferably in the form of rings interlocked with one or more links of the chains, and they are adapted to engage the clevises D' and thereby prevent the rear doubletrees being drawn forward beyond a certain distance. It follows from this that the stops, while permitting sufficient play of the chain to properly distribute the draft, effectually prevent the rear animals from drawing the front animals back such a distance as to cause crowding.

It will be appreciated from the foregoing that my improved equalizer, notwithstanding its simplicity, is adapted to effectually distribute the draft among the several draft-animals. It will also be appreciated that by reason of the disposition of the draft-animals and the fact that they are prevented from crowding each other the task of handling the eight animals is rendered very easy.

Having thus described my invention, what I claim is—

1. A draft-equalizer comprising the lever or evener-bar adapted to be pivotally connected to a tongue or pole, pulleys connected to said lever or evener-bar adjacent to the ends thereof, trees arranged one in front of the other in pairs adapted to be disposed at opposite sides of a tongue or pole, chains connecting the front and rear trees and taking around the pulleys, and stops on the chains for limiting the movement thereof in one direction, substantially as specified.

2. A draft-equalizer comprising the lever or evener-bar adapted to be pivotally connected to a tongue or pole, clevises pivotally connected to the lever or evener-bar and having the parallel cheek-pieces, pulleys mounted between the cheek-pieces of the clevises; said pulleys being of a less height than the cheek-pieces, trees arranged one in front of the other in pairs, chains connecting the front and rear trees and taking around the pulleys, and stops on the chains for engaging the clevises and limiting the movement of the chains in one direction, substantially as specified.

3. The herein-described eight-horse draft-equalizer comprising the pole or tongue, a lever or evener-bar fulcrumed at its middle on the tongue or pole, clevises pivotally connected to the lever or evener-bar adjacent to the ends thereof, pulleys mounted in said clevises, doubletrees arranged in pairs and one in front of the other at opposite sides of the pole or tongue and each equipped with two singletrees, chains connecting the front and rear doubletrees and taking around the pulleys, and rings interlocked with one or more links of the chains and adapted to engage the clevises, substantially as specified.

4. An eight-horse draft-equalizer comprising a lever or evener-bar adapted to be pivotally connected to a tongue or pole, pulleys connected to said lever or evener-bar adjacent to the ends thereof, doubletrees arranged one in front of the other in pairs, disposed at opposite sides of the tongue or pole, chains connecting the front and rear trees and passing around the pulleys, and stops on the chains for limiting the movement thereof, substantially as specified.

5. A draft-equalizer comprising a lever or evener-bar adapted to be fulcrumed on a device to be drawn, pulleys carried by the lever or evener-bar and arranged adjacent to the ends thereof, trees arranged one in front of the other in pairs, and connections between the front and rear trees of each pair, passing around the pulleys carried by the lever or evener-bar, substantially as specified.

6. A draft-equalizer comprising a lever or evener-bar adapted to be pivotally connected to a tongue or pole, pulleys disposed in front of the lever or evener-bar and connected to said bar adjacent to the ends thereof, trees arranged one in front of the other in pairs, disposed at opposite sides of the tongue or pole, connections between the front and rear trees at opposite sides of the tongue or pole and passing around the pulleys, and stops on said connections, substantially as specified.

In testimony whereof I have hereunto set my hand in presence of two subscribing witnesses.

GEORGE W. RUSSELL.

Witnesses:
   EMIL W. PARNO,
   W. H. DARR.